UNITED STATES PATENT OFFICE 2,134,198

LITHOPONE AND PROCESS OF MAKING SAME

Kenneth S. Mowlds, Baltimore, Md., assignor to The Glidden Company, Cleveland, Ohio, a corporation of Ohio No Drawing. Application December 5, 1934, Serial No. 756,121

12 Claims. (Cl. 134—78)

This invention relates to lithopone, and has particular reference to a new and improved product which produces when ground in paint vehicles, improved gloss, brushing and flow as compared with ordinary lithopone. More particularly, it refers to a lithopone to which has been added a small percentage of glue or other proteid whereby these properties are imparted to the lithopone.

Lithopone is ordinarily made by the interaction of barium sulfide and zinc sulfate, according to the equation,

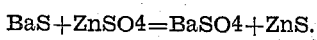

$$BaS + ZnSO_4 = BaSO_4 + ZnS.$$

The precipitate is ordinarily filtered, calcined and quenched; the quenched pigment, in the form of a thick slurry, is wet ground, filtered, dried and pulverized. The pigment is widely used as an ingredient of paints and other coatings, linoleum, paper, etc.

Pigments related to ordinary zinc lithopone, and which possess similar properties, may be made by the interaction of cadmium sulfate and barium sulfide; the resultant precipitate is a yellow cadmium lithopone. If barium sulphoselenide is used as the precipitant, an orange to red cadmium lithopone is obtained. The ordinary lithopone may also be converted to titanated lithopone, by precipitating in the presence of titanium dioxide.

As is well known, it is possible to vary the physical properties of lithopone pigments by altering conditions during manufacture. It has also been proposed to improve the dispersion properties of these pigments by the use of soaps, fatty acids, fatty oil and other addition agents. There have been, however, no agents employed to improve the gloss of paints, etc., made from lithopones.

In recent work on this pigment, I discovered a method of precipitating lithopone which gave marked improvements in properties, both as to working conditions in the plant, and to its action with paint vehicles. This pigment, and the method of preparing it, is described and claimed in my copending application, Serial Number 739,812, filed August 14, 1934.

The pigment, however, when substituted for ordinary lithopone, gave a very flat-drying paint where a slight gloss is ordinarily obtained. While this flatness is an advantage for certain types of work, it is a serious disadvantage in other paints; and it became necessary to produce a glossing agent to improve this property.

I discovered that improved gloss could be imparted to this lithopone, by the addition to it of a small percentage of a water soluble proteid. In addition to improving the gloss of the paint, I discovered that lithopone with this addition gave a paint of improved flow and brushing properties. I attribute this to the colloidal action of the proteid on the oily vehicle, although this is a mere conjecture.

I have tried proteids with lithopones made by ordinary methods, including the ordinary commercial product, the double strength product (containing 50% zinc sulfide), titanated lithopone and the cadmium lithopones. In every case, the proteid improves the gloss, flow and brushing properties of paint in which the lithopone is used.

My experimental work has covered various common proteids, and I have found that best results are obtained by the use of bone glue. Fish and hide and vegetable glues give good results, but are inferior to bone glue. Gelatine and casein improve gloss and flow, but the improvement is not as marked as it is with the cheaper glue products.

I prefer to add the glue to the wet-ground slurry obtained after calcination of the pigment, although it can be added after quenching and before grinding. I may add from 0.05% to 1.0% of glue, based on the weight of the lithopone. The improvement rises sharply with increasing percentages of glue, up to about 0.5%; it continues to rise somewhat up to 1.0%, but additions above 1.0% seem to do no good and, if too much is used, it may impair the quality of paint made from the lithopone. I prefer to use from 0.25 to 0.5%. I do not know how much of the glue is adsorbed, or adheres, to the pigment; from the improvement in properties, I believe that most of it is adsorbed up to 0.5%, but little more between 0.5 and 1.0% and practically none above 1.0%.

The glue is preferably added in the form of a solution. I find that 5 pounds of glue in 20 gallons of boiling water makes a very convenient solution to handle. On addition of the glue solution, the thick viscous slurry thins out to a limpid liquid; this indicates to me that the glue in some manner changes the colloidal properties of the lithopone. The improved flow and brushing would seem to substantiate this indication.

Example 1

In a preferred form of my invention, I take a typical thick lithopone slurry, of pH 8.0 containing 20 tons of lithopone and 60 tons of water, just after the wet grinding. To it I add a solution of 100 pounds of bone glue in 400 gallons of water. This is equivalent to 0.25% glue. On the addition of less than 2 tons of water to the 80 tons of thick slurry, the slurry changes to a thin liquid, in which the lithopone is suspended. The liquid is thoroughly mixed, and the pigment filtered and dried, as with ordinary lithopone. The resultant pigment was glossier and gave better flow in flat wall paints, then the same lithopone untreated.

Example 2

A similar run was made, using 20 tons of a cadmium yellow lithopone. Equally good results were obtained.

Example 3

The substitution of titanated lithopone, cadmium orange lithopone, and cadmium red lithopone (the last two containing substantial quantities of selenium) gave similar good results, on laboratory batches, using in some cases 0.25% glue, in others 0.50%.

Example 4

50% zinc sulfide lithopone, made by this method, gave similarly improved gloss. In this experiment, 1.0% of glue was used.

Example 5

A small amount of the lithopone slurry of Example 1 was treated with 0.5% of fish glue. An improvement was noted over untreated lithopone; but the product was inferior to that of Example 1.

Example 6

Iron blue was treated in a similar manner, using varying concentrations of glue (0.5 to 10% based on the weight of blue). The dried pigment was found to be harder, and have a higher oil absorption, than the untreated blue, while no advantageous results as to flow and gloss were obtained.

Example 7

Similar experiments with lithol red, an organic pigment, gave results similar to those obtained with the blue pigment. From these last two experiments, it would appear that the proteid addition does not affect all pigments as it does lithopone.

While I have indicated a pH of 8.0 in the examples given above, the addition may be made at any pH obtained by suspending a lithopone in water, either acid or alkaline. The best results, however, are obtainable slightly on the alkaline side (pH 7.5–8.2).

I have found that the addition of 0.25–050% glue, while it changes the gloss and flow of a paint made from the lithopone, has practically no effect on the oil absorption, bodying effects, light-fastness, etc. In some vehicles, particularly low acid number products, the glue gives a thinner body.

The proteid addition offers a convenient method of improving the gloss and flow, imparting qualities of lithopone, no matter how made.

In the claims, the term "lithopone" is intended to cover ordinary lithopone, high zinc sulfide lithopone, titanated lithopone, cadmium lithopone and similar pigments of this family.

I claim:

1. A treated lithopone with improved gloss and flow imparting qualities comprising ordinary lithopone, and a very minor proportion of a proteid of the class consisting of glue, gelatine and casein distributed over the lithopone.

2. A treated lithopone with improved gloss and flow imparting qualities, comprising ordinary lithopone, and a very minor proportion of glue distributed over the lithopone.

3. A treated lithopone with improved gloss and flow imparting qualities, comprising ordinary lithopone, and a very minor proportion of bone glue distributed over the lithopone.

4. A treated lithopone with improved gloss and flow imparting qualities comprising ordinary lithopone, and 0.05 to 1.0% of a proteid of the class consisting of glue, gelatine and casein distributed over the lithopone.

5. A treated lithopone with improved gloss and flow imparting qualities, comprising ordinary lithopone, and 0.05 to 1.0% of glue distributed over the lithopone.

6. A treated lithopone with improved gloss and flow imparting qualities, comprising ordinary lithopone, and 0.05 to 1.0% of bone glue distributed over the lithopone.

7. A treated lithopone with improved gloss and flow imparting qualities comprising ordinary lithopone, and 0.25 to 0.50% of a proteid of the class consisting of glue, gelatine and casein distributed over the lithopone.

8. A treated lithopone with improved gloss and flow imparting qualities, comprising ordinary lithopone, and 0.25 to 0.50% of glue distributed over the lithopone.

9. A treated lithopone with improved gloss and flow imparting qualities, comprising ordinary lithopone, and 0.25 to 0.50% of bone glue distributed over the lithopone.

10. The method of improving the gloss and flow imparting properties of lithopone which comprises adding to a lithopone slurry a solution of a very minor proportion of a proteid of the class consisting of glue, gelatine and casein, separating the pigment from the bulk of the water and drying.

11. The method of claim 10, in which the proteid is glue.

12. The method of claim 10, in which the proteid is glue, in the proportion of 0.05 to 1% of the lithopone.

KENNETH S. MOWLDS.